(12) United States Patent
Yadav

(10) Patent No.: US 7,229,600 B2
(45) Date of Patent: Jun. 12, 2007

(54) NANOPARTICLES OF RARE EARTH OXIDES

(75) Inventor: Tapesh Yadav, Longmont, CO (US)

(73) Assignee: NanoProducts Corporation, Longmont, CO (US)

( * ) Notice: Subject to any disclaimer, the term of this patent is extended or adjusted under 35 U.S.C. 154(b) by 315 days.

(21) Appl. No.: 10/726,512

(22) Filed: Dec. 4, 2003

(65) Prior Publication Data

US 2007/0104629 A1 May 10, 2007

Related U.S. Application Data

(60) Provisional application No. 60/443,947, filed on Jan. 31, 2003.

(51) Int. Cl.
*C01F 17/00* (2006.01)
(52) U.S. Cl. .............. 423/263; 423/21.1; 977/773; 977/775; 977/777; 977/811
(58) Field of Classification Search .......... 423/21.1, 423/263; 501/11, 1, 126; 106/400, 3; 502/302; 252/301.4 R; 257/414; 427/58; 977/773, 977/775, 777, 811
See application file for complete search history.

(56) References Cited

U.S. PATENT DOCUMENTS

| 5,077,240 A * | 12/1991 | Hayden et al. ............... 501/67 |
| 5,427,767 A | 6/1995 | Kresse et al. |
| 5,660,774 A | 8/1997 | Stangle et al. |
| 5,788,738 A | 8/1998 | Pirzada et al. |
| 5,851,507 A | 12/1998 | Pirzada et al. |
| 5,984,997 A | 11/1999 | Bickmore et al. |
| 6,113,807 A | 9/2000 | Yamaura et al. |
| 6,228,904 B1 | 5/2001 | Yadav et al. |
| 6,290,875 B1 * | 9/2001 | Oshio et al. .......... 252/301.4 R |
| 6,316,377 B1 * | 11/2001 | Fulton et al. ................ 501/151 |
| 6,344,271 B1 | 2/2002 | Yadav et al. |
| 6,379,583 B1 | 4/2002 | Gray et al. |
| 6,387,981 B1 | 5/2002 | Zhang et al. |
| 6,513,362 B1 * | 2/2003 | Yadav et al. ................ 73/31.05 |
| 6,514,617 B1 | 2/2003 | Hubbard et al. |
| 6,517,802 B1 | 2/2003 | Xiao et al. |
| 6,569,397 B1 | 5/2003 | Yadav et al. |
| 6,627,114 B2 * | 9/2003 | Suzuki ................ 252/301.4 R |
| 6,652,967 B2 | 11/2003 | Yadav et al. |
| 6,656,588 B1 | 12/2003 | Laine et al. |
| 6,667,019 B2 | 12/2003 | Fulton et al. |
| 2002/0176987 A1 * | 11/2002 | Yadav et al. ................ 428/402 |
| 2002/0178865 A1 | 12/2002 | Yadav et al. |
| 2003/0124050 A1 | 7/2003 | Yadav et al. |
| 2003/0132420 A1 | 7/2003 | Yadav et al. |
| 2004/0023785 A1 * | 2/2004 | Feltz et al. ................... 501/11 |

OTHER PUBLICATIONS

"Progress in the Science and Technology of the Rare Earths" vol. 1, edited by LeRoy Eyring, The MacMillan Co., New York, N.Y. USA (1964), Library of Congress Catalog Card No. 62-21550, pp. 416-423.*
Mackay et al., *Introduction to Modern Inorganic Chemistry*, 4th edition, 1989, pp. 166-172.

* cited by examiner

*Primary Examiner*—Timothy C. Vanoy
(74) *Attorney, Agent, or Firm*—Foley & Lardner LLP

(57) ABSTRACT

Rare earth compositions comprising nanoparticles, methods of making nanoparticles, and methods of using nanoparticles are described. The compositions of the nanomaterials discussed may include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). The nanoparticles can be used to make organometallics, nitrates, and hydroxides. The nanoparticles can be used in a variety of applications, such as pigments, catalysts, polishing agents, coatings, electroceramics, catalysts, optics, phosphors, and detectors.

28 Claims, 1 Drawing Sheet

NANOPARTICLES OF RARE EARTH OXIDES

RELATED APPLICATIONS

The present application claims benefit of provisional application No. 60/443,947 filed Jan. 31, 2003, which application is hereby incorporated by reference in its entirety.

FIELD OF THE INVENTION

The present invention relates to methods of manufacturing submicron and nanoscale rare earth element comprising powders and applications of such powders.

RELEVANT BACKGROUND

Powders are used in numerous applications. They are the building blocks of electronic, telecommunication, electrical, magnetic, structural, optical, biomedical, chemical, thermal, and consumer goods. On-going market demands for smaller, faster, superior, and more portable products have demanded miniaturization of numerous devices. This, in turn, demands miniaturization of the building blocks, i.e. the powders. Sub-micron and nano-engineered (or nanoscale, nanosize, ultrafine) powders, with sizes 10 to 100 times smaller than conventional micron size powders, enable quality improvement and differentiation of product characteristics at scales currently unachievable by commercially available micron-sized powders.

Nanopowders in particular and sub-micron powders in general are a novel family of materials whose distinguishing feature is that their domain size is so small that size confinement effects become a significant determinant of the materials' performance. Such confinement effects can, therefore, lead to a wide range of commercially important properties. Nanopowders, therefore, are an extraordinary opportunity for design, development and commercialization of a wide range of devices and products for various applications. Furthermore, since they represent a whole new family of material precursors where conventional coarse-grain physiochemical mechanisms are not applicable, these materials offer unique combinations of properties that can enable novel and multifunctional components of unmatched performance. Yadav et al. in U.S. Pat. No. 6,344,271 and in co-pending and commonly assigned U.S. patent application Ser. Nos. 09/638,977, 10/004,387, 10/071,027, 10/113,315, and 10/292,263 all of which along with the references contained therein are hereby incorporated by reference in their entirety, teach some applications of sub-micron and nanoscale powders.

SUMMARY OF THE INVENTION

Briefly stated, the present invention involves methods for manufacturing nanoscale rare earth oxide powders and applications thereof.

In some embodiments, an objective of the present invention is to describe nanoparticles of single metal rare earth element oxides and oxides comprising one or more rare earth metals In some embodiments, an objective of the present invention is to disclose methods for manufacturing rare earth metal oxides.

In some embodiments, an objective of the present invention is oxide composites and coatings that comprise rare earth oxides.

In some embodiments, an objective of the invention is to provide oxides comprising of rare earth oxides.

In some embodiments, an objective is the development of superior ultraviolet absorbing pigment for a variety of applications.

In some embodiments, an objective is the development of superior catalysts for a variety of applications.

In some embodiments, an objective is development of superior electrochemical materials for a variety of applications.

In some embodiments, an objective is the development of superior materials and devices for optical, sensing, thermal, biomedical, structural, superconductive, energy, and security uses in addition to a variety of other uses easily recognized by one of ordinary skill in the art.

In some embodiments, an objective is to describe methods for producing novel rare earth element oxide powders in high volume, low-cost, and reproducible quality.

In some embodiments, an objective is to develop nanoscale materials comprising at least one rare earth element.

DETAILED DESCRIPTION OF THE PREFERRED EMBODIMENTS

Figure 1:
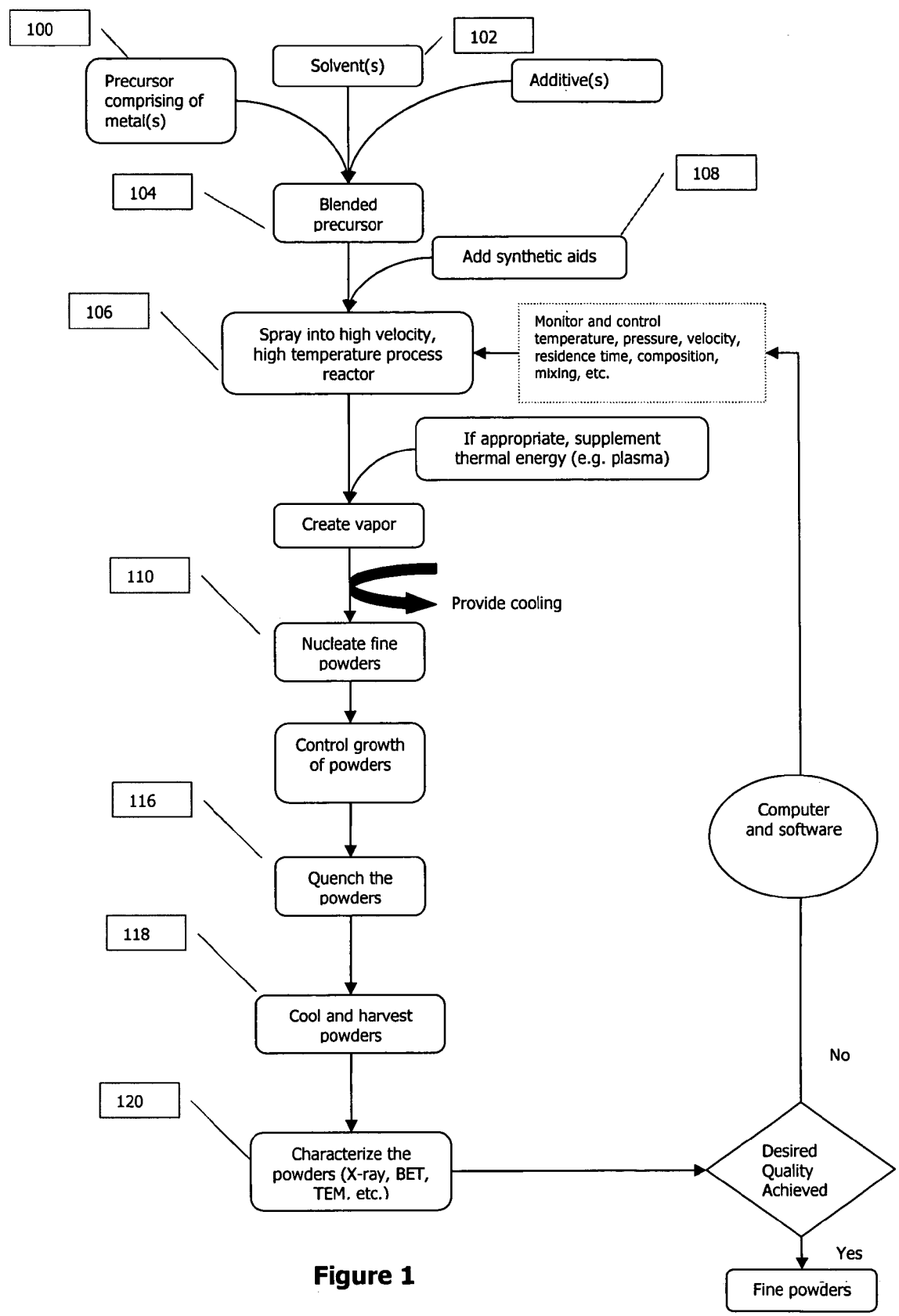
FIG. 1 shows an exemplary overall approach for producing submicron and nanoscale powders in accordance with the present invention.

This invention is generally directed to very fine powders comprising rare earth elements and specifically to rare earth element oxides. The scope of the teachings includes high purity powders. Powders discussed herein are of mean crystallite size less than 1 micron, and in certain embodiments less than 100 nanometers. Methods for producing and utilizing such powders in high volume, low-cost, and reproducible quality are also outlined.

Definitions

For purposes of clarity the following definitions are provided to aid the understanding of the description and specific examples provided herein:

"Fine powders" as used herein, refers to powders that simultaneously satisfy the following criteria:

(1) particles with mean size less than 10 microns; and (2) particles with aspect ratio between 1 and 1,000,000.

For example, in some embodiments, the fine powders are powders that have particles with a mean domain size less than 5 microns and with an aspect ratio ranging from 1 to 1,000,000.

"Submicron powders" as used herein, refers to fine powders that simultaneously satisfy the following criteria:

(1) particles with mean size less than 1 micron; and (2) particles with aspect ratio between 1 and 1,000,000.

For example, in some embodiments, the submicron powders are powders that have particles with a mean domain size less than 500 nanometers and with an aspect ratio ranging from 1 to 1,000,000.

The terms "nanopowders," "nanosize powders," "nanoparticles," and "nanoscale powders" are used interchangeably and refer to fine powders that simultaneously satisfy the following criteria:

(1) particles having a mean size less than 250 nanometers; and (2) particles with an aspect ratio between 1 and 1,000,000.

For example, in some embodiments, the nanopowders are powders that have particles with a mean domain size less than 100 nanometers and with an aspect ratio ranging from 1 to 1,000,000.

Pure powders, as the term used herein, are powders that have composition purity of at least 99.9% by metal basis. For example, in some embodiments the purity is 99.99%.

"Domain size," as that term is used herein, refers to the minimum dimension of a particular material morphology. In the case of powders, the domain size is the grain size. In the case of whiskers and fibers, the domain size is the diameter. In the case of plates and films, the domain size is the thickness.

The terms "powder," "particle," and "grain" are used interchangeably and encompass oxides, carbides, nitrides, borides, chalcogenides, halides, metals, intermetallics, ceramics, polymers, alloys, and combinations thereof. These terms include single metal, multi-metal, and complex compositions. These terms further include hollow, dense, porous, semi-porous, coated, uncoated, layered, laminated, simple, complex, dendritic, inorganic, organic, elemental, non-elemental, composite, doped, undoped, spherical, non-spherical, surface functionalized, surface non-functionalized, stoichiometric, and non-stoichiometric forms or substances. Further, the term powder in its generic sense includes one-dimensional materials (fibers, tubes, etc.), two-dimensional materials (platelets, films, laminates, planar, etc.), and three-dimensional materials (spheres, cones, ovals, cylindrical, cubes, monoclinic, parallelolipids, dumbbells, hexagonal, truncated dodecahedron, irregular shaped structures, etc.).

"Aspect ratio," as the term is used herein, refers to the ratio of the maximum to the minimum dimension of a particle.

"Precursor," as the term is used herein, encompasses any raw substance that can be transformed into a powder of same or different composition. In certain embodiments, the precursor is a liquid. The term precursor includes, but is not limited to, organometallics, organics, inorganics, solutions, dispersions, melts, sols, gels, emulsions, or mixtures.

"Powder," as the term is used herein, encompasses oxides, carbides, nitrides, chalcogenides, metals, alloys, and combinations thereof. The term includes hollow, dense, porous, semi-porous, coated, uncoated, layered, laminated, simple, complex, dendritic, inorganic, organic, elemental, non-elemental, dispersed, composite, doped, undoped, spherical, non-spherical, surface functionalized, surface non-functionalized, stoichiometric, and non-stoichiometric forms or substances.

"Coating" (or "film" or "laminate" or "layer"), as the term is used herein, encompasses any deposition comprising submicron and nanoscale powders. The term includes in its scope a substrate or surface or deposition or a combination that is hollow, dense, porous, semi-porous, coated, uncoated, simple, complex, dendritic, inorganic, organic, composite, doped, undoped, uniform, non-uniform, surface functionalized, surface non-functionalized, thin, thick, pretreated, post-treated, stoichiometric, or non-stoichiometric form or morphology.

"Dispersion," as the term is used herein, encompasses inks, pastes, creams, lotions, Newtonian, non-Newtonian, uniform, non-uniform, transparent, translucent, opaque, white, black, colored, emulsified, with additives, without additives, water-based, polar solvent-based, or non-polar solvent-based mixture of powder in any fluid or fluid-like state of substance.

For the purposes of the present invention, scandium (Sc), yttrium (Y), and lanthanum (La) are considered "rare earth" elements. K M Mackay & R A Mackay, Introduction to Modern Inorganic Chemistry $4^{th}$ Ed. at 166–72 (Blackie & Son Ltd., London 1989).

This invention is directed to submicron and nanoscale powders comprising at least one rare earth element, and in some embodiments, the invention is directed to submicron and nanoscale powders comprising at least one rare earth element containing oxide. Rare earth elements include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Given the relative abundance of rare earth elements in the earth's crust and current limitations on purification technologies, it is expected that many commercially produced materials would have naturally occurring rare earth element impurities. These impurities are expected to be below 100 parts per million and in most cases in concentration similar to non-rare earth element impurities. Removal of such impurities most likely will not materially affect the properties of interest to an application. For the purposes herein, powders comprising rare earth element impurities present in concentration similar to non-rare earth element impurities are excluded from the scope of this invention. However, it is emphasized that one or more rare earth elements may be intentionally engineered as a dopant into a powder at concentrations of 100 ppm or less, and these are included in the scope of this patent.

In a generic sense, the invention teaches nanoscale powders, and in a more generic sense, submicron powders comprising at least 100 ppm by weight of a rare earth element. The invention also teaches nanoscale and submicron powders comprising less than 100 ppm by weight of at least one rare earth element when the rare earth element is intentionally engineered into the powder. In some embodiments, the rare earth element may be greater than 1 weight % by metal basis and in some embodiments greater than 10 weight % by metal basis. The one or more rare earth elements may be selected from the group—scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

While several embodiments for manufacturing nanoscale and submicron powders comprising rare earth elements are disclosed, for the purposes herein, the nanoscale or submicron powders may be produced by any method or may result as a byproduct from any process.

FIG. 1 shows an exemplary overall approach for the production of submicron powders in general and nanopowders in particular. The process shown in FIG. 1 begins with a rare earth containing precursor raw material. The rare earth containing precursors may be, but are not limited to, coarse oxide powders, metal powders, salts, slurries, waste products, organic compounds, or inorganic compounds. FIG. 1 shows one embodiment of a system for producing nanoscale and submicron powders in accordance with the present invention.

The process shown in FIG. 1 begins at 100 with a rare earth metal-containing precursor such as an emulsion, fluid, particle-containing liquid slurry, or water-soluble salt. The precursor may be a gas, a single-phase liquid, a multi-phase liquid, a melt, a sol, a solution, a fluid mixture, or combinations thereof. The metal-containing precursor may comprise a stoichiometric or a non-stoichiometric metal composition with at least some part in a fluid phase. Fluid precursors may be utilized in certain embodiments of this invention rather than solid precursors, because fluids are easier to convey, evaporate, and thermally process, and the resulting product is more uniform.

In some embodiments of this invention, the precursors are environmentally benign, safe, readily available, high-metal loading, lower cost fluid materials. Examples of rare earth metal-containing precursors suitable for purposes of this invention include, but are not limited to, metal acetates, metal carboxylates, metal ethanoates, metal alkoxides, metal octoates, metal chelates, metallo-organic compounds, metal halides, metal azides, metal nitrates, metal sulfates, metal hydroxides, metal salts soluble in organics or water, and metal-containing emulsions.

In other embodiments, multiple metal precursors may be mixed if complex nanoscale and submicron powders are desired. For example, a cerium precursor and a praseodymium precursor may be mixed to prepare praseodymium doped cerium oxide powders for pigment applications. As another example, a yttrium precursor, barium precursor, and copper precursor may be mixed in correct proportions to yield a high purity YBCO powder for superconducting applications. In yet another example, a neodymium precursor and titanium precursor may be mixed to yield neodymium titanate powders for electroceramic device applications. Such complex nanoscale and submicron powders can help create materials with surprising and unusual properties not available through the respective single metal oxides or a simple nanocomposite formed by physical blending powders of different compositions.

It is desirable to use precursors of a higher purity to produce a nanoscale or submicron powder of a desired purity. For example, if a purity greater than x % (by metal weight basis) is desired, one or more precursors that are mixed and used should preferably have purities greater than or equal to x % (by metal weight basis) to practice the teachings herein.

With continued reference to FIG. 1, the metal-containing precursor 100 (containing one or a mixture of metal-containing precursors) is fed into a high temperature process 106, which may be implemented using a high temperature reactor, for example. In some embodiments, a synthetic aid such as a reactive fluid 108 may be added along with the precursor 100 as it is being fed into the reactor 106. Examples of such reactive fluids include, but are not limited to, oxygen gas and air.

While the above examples specifically teach methods of preparing nanoscale and submicron powders of oxides, the teachings may be readily extended in an analogous manner to other compositions such as carbides, nitrides, borides, carbonitrides, and chalcogenides. In some embodiments, high temperature processing may be used. However, a moderate temperature processing or a low/cryogenic temperature processing may also be employed to produce nanoscale and submicron powders using the methods of the present invention.

The precursor 100 may be pre-processed in a number of other ways before any thermal treatment. For example, the pH may be adjusted to ensure precursor stability. Alternatively, selective solution chemistry, such as precipitation, may be employed to form a sol or other state of matter. The precursor 100 may be pre-heated or partially combusted before the thermal treatment.

The precursor 100 may be injected axially, radially, tangentially, or at any other angle into the high temperature region 106. As stated above, the precursor 100 may be pre-mixed or diffusionally mixed with other reactants. The precursor 100 may be fed into the thermal processing reactor by a laminar, parabolic, turbulent, pulsating, sheared, or cyclonic flow pattern, or by any other flow pattern. In addition, one or more metal-containing precursors 100 can be injected from one or more ports in the reactor 106. The feed spray system may yield a feed pattern that envelops the heat source or, alternatively, the heat sources may envelop the feed, or alternatively, various combinations of this may be employed. In some embodiments, the spray is atomized and sprayed in a manner that enhances heat transfer efficiency, mass transfer efficiency, momentum transfer efficiency, and reaction efficiency. The reactor shape may be cylindrical, spherical, conical, or any other shape. Methods and equipment such as those taught in U.S. Pat. Nos. 5,788,738, 5,851,507, and 5,984,997 (each of which is specifically incorporated herein by reference) can be employed in practicing the methods of this invention.

With continued reference to FIG. 1, after the precursor 100 has been fed into reactor 106, it may be processed at high temperatures to form the product powder. In other embodiments, the thermal processing may be performed at lower temperatures to form the powder product. The thermal treatment may be done in a gas environment with the aim to produce products, such as powders, that have the desired porosity, density, morphology, dispersion, surface area, and composition. This step produces by-products such as gases. To reduce costs, these gases may be recycled, mass/heat integrated, or used to prepare the pure gas stream desired by the process.

In embodiments using high temperature thermal processing, the high temperature processing may be conducted at step 106 (FIG. 1) at temperatures greater than 1500 K, in some embodiments greater than 2500 K, in some embodiments greater than 3000 K, and in some embodiments greater than 4000 K. Such temperatures may be achieved by various methods including, but not limited to, plasma processes, combustion, pyrolysis, electrical arcing in an appropriate reactor, and combinations thereof. The plasma may provide reaction gases or may provide a clean source of heat.

A high temperature thermal process at 106 results in a vapor comprising fine powders. After the thermal processing, this vapor is cooled at step 110 to nucleate submicron powders, in certain embodiments nanopowders. In certain embodiments, the cooling temperature at step 110 is maintained high enough to prevent moisture condensation. The dispersed particles form because of the thermokinetic conditions in the process. By engineering the process conditions, such as pressure, residence time, supersaturation and nucleation rates, gas velocity, flow rates, species concentrations, diluent addition, degree of mixing, momentum transfer, mass transfer, and heat transfer, the morphology of the nanoscale and submicron powders can be tailored. It is important to note that the focus of the process should be on producing a powder product that excels in satisfying the end application requirements and customer needs.

In certain embodiments, the nano-dispersed powder is quenched after cooling to lower temperatures at step 116 to minimize and prevent agglomeration or grain growth. Suitable quenching methods include, but are not limited to, methods taught in U.S. Pat. No. 5,788,738. In certain embodiments, sonic to supersonic quenching may be used. In certain embodiments, quenching methods are employed which can prevent deposition of the powders on the conveying walls. These methods may include, but are not limited to, electrostatic means, blanketing with gases, the use of higher flow rates, mechanical means, chemical means, electrochemical means, or sonication/vibration of the walls.

In some embodiments, the high temperature processing system includes instrumentation and software that can assist in the quality control of the process. Furthermore, in certain embodiments the high temperature processing zone 106 is operated to produce fine powders 120, in certain embodiments submicron powders, and in certain embodiments nanopowders. The gaseous products from the process may be monitored for composition, temperature, and other variables to ensure quality at step 112 (FIG. 1). The gaseous products may be recycled to be used in process 108 or used as a valuable raw material when nanoscale and submicron powders 120 have been formed, or they may be treated to remove environmental pollutants if any. Following quenching step 116, the nanoscale and submicron powders may be cooled further at step 118 and then harvested at step 120.

The product nanoscale and submicron powders 120 may be collected by any method. Suitable collection means include, but are not limited to, bag filtration, electrostatic separation, membrane filtration, cyclones, impact filtration, centrifugation, hydrocyclones, thermophoresis, magnetic separation, and combinations thereof.

The quenching at step 116 may be modified to enable preparation of coatings. In such embodiments, a substrate may be provided (in batch or continuous mode) in the path of the quenching powder containing gas flow. By engineering the substrate temperature and the powder temperature, a coating comprising the submicron powders and nanoscale powders can be formed.

In some embodiments, a coating, film, or component may also be prepared by dispersing the fine nanopowder and then applying various known methods, such as, but not limited to, electrophoretic deposition, magnetophorectic deposition, spin coating, dip coating, spraying, brushing, screen printing, ink-jet printing, toner printing, and sintering. The nanopowders may be thermally treated or reacted to enhance their electrical, optical, photonic, catalytic, thermal, magnetic, structural, electronic, emission, processing or forming properties before such a step.

It should be noted that the intermediate or product at any stage, or similar process based on modifications by those skilled in the art, may be used directly as a feed precursor to produce nanoscale or fine powders by methods taught herein and other methods, such as, but not limited to, those taught in commonly owned U.S. Pat. Nos. 5,788,738, 5,851,507, 5,984,997, and co-pending U.S. patent application Ser. Nos. 09/638,977 and 60/310,967 which are all incorporated herein by reference in their entirety. For example, a sol may be blended with a fuel and then utilized as the feed precursor mixture for thermal processing above 2500 K to produce nanoscale simple or complex powders.

In summary, one embodiment for manufacturing powders consistent with teachings herein, comprises (a) preparing a fluid precursor comprising at least 100 ppm by weight of one rare earth metal; (b) feeding the precursor into a high temperature reactor operating at temperatures greater than 1500 K, in certain embodiments 2500 K, in certain embodiments 3000 K, and in certain embodiments 4000 K; (c) wherein, in the high temperature reactor, the precursor converts into vapor comprising the rare earth metal in a process stream with velocity above 0.25 mach; (d) the vapor is cooled to nucleate submicron or nanoscale powders; (e) the powders are then quenched at high gas velocities to prevent agglomeration and growth; and (f) the quenched powders are filtered from the gases.

Another embodiment for manufacturing powders consistent with teachings herein, comprises (a) preparing a fluid precursor comprising at least 100 ppm by weight of two or more rare earth metals; (b) feeding the precursor into a high temperature reactor operating at temperatures greater than 1500 K, in certain embodiments 2500 K, in certain embodiments 3000 K, and in certain embodiments 4000 K; (c) wherein, in the high temperature reactor, the precursor converts into vapor comprising the rare earth metals; (d) the vapor is cooled to nucleate submicron or nanoscale powders; (e) the powders are then quenched at high gas velocities to prevent agglomeration and growth; and (f) the quenched powders are filtered from the gases.

Yet another embodiment for manufacturing coatings consistent with teachings herein, comprises (a) preparing a fluid precursor comprising at least 100 ppm by weight of one or more rare earth metals; (b) feeding the precursor into a high temperature reactor operating at temperatures greater than 1500 K, in certain embodiments greater than 2500 K, in certain embodiments greater than 3000 K, and in certain embodiments greater than 4000 K; (c) wherein, in the high temperature reactor, the precursor converts into vapor comprising the rare earth metals in a process stream with velocity above 0.25 mach; (d) the vapor is cooled to nucleate submicron or nanoscale powders; and (e) the powders are then quenched onto a substrate to form a coating comprising the rare earth metals on the substrate.

The powders produced by teachings herein may be modified by any post-processing means, such as those taught by commonly owned U.S. patent application Ser. No. 10/113,315 which is hereby incorporated by reference in full.

Methods for Incorporating Nanoparticles into Products

The submicron and nanoscale powders taught herein may be incorporated into a composite structure by any method. Some non-limiting exemplary methods are taught in commonly owned U.S. Pat. No. 6,228,904 which is hereby incorporated by reference in full.

The submicron and nanoscale powders taught herein may be incorporated into plastics by any method. For example, an embodiment consistent with teachings herein, comprises (a) preparing nanoscale or submicron powders comprising rare earth metals by any method, such as a method that includes a step that operates above 1000 K and a process stream velocity above 0.25 mach; (b) providing powders of one or more plastics; (c) mixing the nanoscale or submicron powders with the powders of plastics; and (d) co-extruding the mixed powders into a desired shape at temperatures greater than the softening temperature of the powders of plastics but less than the degradation temperature of the powders of plastics. In another embodiment, a master batch of the plastic powder comprising rare earth metal containing nanoscale or submicron powders may be prepared. These master batches can later be processed into useful products by techniques well known to those skilled in the art. In yet another embodiment, the rare earth metal containing nanoscale or submicron powders are pretreated to coat the nanoscale powder surface for ease in dispersability and to ensure homogeneity. In a further embodiment, injection molding of the mixed powders comprising nanoscale powders and plastic powders is employed to prepare useful products.

Some embodiments for incorporating nanoscale or submicron powders into plastics consistent with teachings herein comprise (a) preparing nanoscale or submicron powders comprising rare earth metals by any method, such as a method that includes a step that operates above 1000 K and a process stream velocity above 0.25 mach; (b) providing a film of one or more plastics wherein the film may be laminated, extruded, blown, cast, molded or some combination thereof; and (c) coating the nanoscale or submicron powders on the film of plastic by techniques such as, but not limited to, spin coating, dip coating, spray coating, ion beam coating, or sputtering. In another embodiment, a nanostructured coating is formed directly on the film by techniques such as those taught herein. In certain embodiments, the grain size of the coating is less than 200 nm, in certain embodiments less than 75 nm, and in certain embodiments less than 25 nm.

The submicron and nanoscale powders taught herein may be incorporated into glass by any method. An embodiment consistent with teachings herein, comprises (a) preparing nanoscale or submicron powders comprising rare earth metals by any method, such as a method that includes a step that operates above 1000 K and a process stream velocity above 0.25 mach; (b) providing powders of one or more glasses; (c) mixing the nanoscale or submicron powders with the powders of glasses; and (d) processing the mixed powders into a desired shape at temperatures greater than the softening temperature of the glass but less than 60% of the melting temperature of the nanoscale or submicron powders. In yet another embodiment, the rare earth metal containing nanoscale or submicron powders are pretreated to coat the powder surface for ease in dispersability and to ensure homogeneity. In a further embodiment, extrusion or injection molding of the mixed powders comprising nanoscale powders and plastic powders is employed to prepare useful products.

One embodiment for incorporating nanoscale or submicron powders into glasses consistent with teachings herein, comprises (a) preparing nanoscale or submicron powders comprising rare earth metals by any method, such as a method that includes a step that operates above 1000 K and a process stream velocity above 0.25 mach; (b) providing a sheet of one or more glasses wherein the glasses may be laminated, extruded, blown, cast, molded, coated, colored, or where the sheet is a part of another product; and (c) coating the nanoscale or submicron powders on the sheet of glass by techniques such as, but not limited to, spin coating, dip coating, spray coating, ion beam coating, vapor deposition, sputtering. In another embodiment, a nanostructured coating is formed directly on the film by techniques such as those taught herein. In certain embodiments, the grain size of the nanostructured coating is less than 100 nm, in certain embodiments less than 50 nm, and in certain embodiments less than 25 nm.

The submicron and nanoscale powders taught herein may be incorporated into paper by any method. One embodiment consistent with teachings herein, comprises (a) preparing nanoscale or submicron powders comprising rare earth metals; (b) providing paper pulp; (c) mixing the nanoscale or submicron powders with the paper pulp; and (d) processing the mixed powders into paper by steps such as, but not limited to, molding, couching and calendering. In yet another embodiment, the rare earth metal containing nanoscale or submicron powders are pretreated to coat the powder surface for ease in dispersability and to ensure homogeneity. In a further embodiment, nanoparticles are applied directly on the manufactured paper or paper-based product. The small size of nanoparticles enables them to permeate through the paper fabric and thereby functionalize the paper. In the alternative, the nanoparticles may bind or adhere to the paper surface without penetrating the paper surface.

The submicron and nanoscale powders taught herein may be incorporated into leather, fibers, or fabric by any method. One embodiment consistent with teachings herein comprises (a) preparing nanoscale or submicron powders comprising orare earth metals by any method, such as a method that includes a step that operates above 1000 K and a process stream velocity above 0.25 mach; (b) providing leather, fibers, fabric, or combination thereof; (c) bonding the nanoscale or submicron powders with the leather, fibers, fabric, or combination thereof; and (d) processing the bonded leather, fibers, fabric, or combination thereof into a product. In yet another embodiment, the rare earth metal containing nanoscale or submicron powders are pretreated to coat the powder surface for ease in bonding or dispersability or to ensure homogeneity. In a further embodiment, nanoparticles are applied directly on a manufactured product based on leather, fibers, fabric, or combination thereof; the small size of nanoparticles enables them to permeate through the leather or fibers (polymer, wool, cotton, flax, animal-derived, agri-derived) or fabric and thereby functionalize the leather, fibers, fabric, or combination thereof. In the alternative, the nanoparticles may adhere or bind to the surface without penetrating.

The submicron and nanoscale powders taught herein may be incorporated into creams or inks by any method. An illustrative embodiment consistent with teachings herein comprises (a) preparing nanoscale or submicron powders comprising rare earth metals; (b) providing a formulation of cream or ink; and (c) mixing the nanoscale or submicron powders with the cream or ink. In yet another embodiment, the rare earth metal containing nanoscale or submicron powders are pretreated to coat the powder surface for ease in dispersability and to ensure homogeneity. In a further embodiment, a pre-existing formulation of a cream or ink is mixed with nanoscale or submicron powders to functionalize the cream or ink.

Applications of Nanoparticles and Submicron Powders Comprising Rare Earth Elements Pigments Nanoparticles of multimetal oxides comprising rare earth metals offer some surprising and unusual benefits as pigments. Nanoparticles are smaller than the visible wavelengths of light which leads to visible wavelengths interacting in unusual ways with nanoparticles compared to particles with grain size much bigger than the visible wavelengths (400–700 nm). The small size of nanoparticles can also lead to more uniform dispersion. In certain embodiments the nanoparticles are non-agglomerated (i.e. do not have sintered neck formation or hard agglomeration). In addition, in certain embodiments, the nanoparticles have clean surfaces or surfaces modified or functionalized systematically to enable bonding with the matrix in which they are to be dispersed. Rare earth metal containing nanoparticles of pigments can therefore offer the unusual combination of very high light fastness (as measured by standards such as DIN 53387 and 54003), outstanding heat stability (as measured by standards such as DIN 53772), fastness to migration (as measured by standards such as DIN 53775), color strength and optical transparency.

Iron, titanium, and zinc containing pigments may lead to degradation of plastics and other matrices because of photocatalytic effects and other effects. This problem can be surprisingly solved by providing a nanolayer coating (coating thickness less than 100 nm, in certain embodiments less than 20 nm, and in certain embodiments less than 10 nm) of a substance comprising one or more rare earth elements. Similarly, laminated multilayer nanoparticles can be created to provide color shift type of pigments.

One of the outstanding process challenges for manufacturing inorganic color pigments is the ability to ensure homogeneous lattice level mixing of elements in a complex multi-metal formulation. One of the unique features of the processes described herein, in certain embodiments, is their ability to prepare complex compositions with the necessary homogeneity. Therefore, the teachings herein are ideally suited for creating color and making superior performing pigments with nanoparticles comprising rare earth elements.

Some non-limiting illustrations of pigments containing rare earth elements are nanoparticles of Pr-doped cerium oxide (red pigment), Pr-doped zirconium silicate (yellow pigment), ceria nanolayer coated cobalt-based blue, ceria nanolayer coated cobalt zinc-silicate, ceria nanolayer coated vandate, and non-stoichiometric substances comprising rare earth elements.

In one embodiment, a method for manufacturing a pigmented product comprises (a) preparing nanoscale or submicron powders comprising rare earth metals by any method, such as a method operating above 1000 K and a process stream velocity above 0.25 mach; (b) providing powders of one or more plastics; (c) mixing the nanoscale or submicron powders with the powders of plastics; and (d) processing the mixed powders into the product. In yet another embodiment, the rare earth metal containing nanoscale or submicron powders are pretreated to coat the powder surface with organic or inorganic functional groups or compounds for ease in dispersability and to ensure homogeneity. In a yet another embodiment, extrusion or injection molding of the mixed powders comprising nanoscale powders and plastic powders may be employed to prepare useful products.

Additives

Ultraviolet radiation in the 280–400 nm range causes most damage to consumer products exposed to sun light. Furthermore, ultraviolet radiation is known to be harmful to human skin. Superior methods for protecting consumer products and superior ultraviolet filters are commercially needed. Organic pigments and additives are currently utilized to provide such protection. However, such organic pigments may have a limited life as they provide the protection by sacrificially absorbing ultraviolet radiation while undergoing degradation. More permanent, long lasting protection is desired. Nanoparticles of metal oxides comprising rare earth elements offer a unique and surprising way to provide such long lasting superior protection. As a non-limiting example, an oxide nanoparticle comprising a cerium (Ce(IV)) ion strongly absorbs ultraviolet radiation below 400 nm while being essentially transparent to the visible wavelength of light. It is desirable to tailor the particle size distribution such that it is less than at least some wavelengths of visible light (that is, the $d_{99}$ of particle size distribution should be less than 400 nm, in certain embodiments 200 nm, in certain embodiments 100 nm, and in certain embodiments less than 50 nm). Once such oxide nanoscale powders comprising Ce(IV) are available, they can be utilized to shield ultraviolet radiation and consequent damage. It should be noted that one of the unique advantages of nanoscale powder comprising rare earth elements is that by ensuring purity and optimum composition, the generation of undesirable photoactivated free radicals may be prevented. Such photocatalytic radicals are commonly found with zinc oxide and titanium oxide. Yet another unexpected benefit of nanoscale powder comprising rare earth elements is the very high affinity for oxygen and sulfur by rare earth elements. This features promotes stability of such oxides in demanding conditions. A specific but non-limiting example of an ultraviolet absorbing pigment would be Ce(IV) oxide nanopowder with purity greater than 99%, in certain embodiments greater than 99.9%, and in certain embodiments greater than 99.99%. Other examples of ultraviolet absorbing pigments include, but are not limited to, nanopowders of cerium-doped zinc oxide, cerium doped titanium oxide, cerium oxide coated titanium oxide, cerium oxide coated zinc oxide, cerium silicate, and non-stoichiometric multimetal oxides. The purity of such nanopowders may be greater than 99% by metal weight in some embodiments, greater than 99.9% by metal weight in other embodiments, and greater than 99.99% by metal weight in still further embodiments.

In another embodiment, a mixture of rare earth metals in different oxidation states (e.g. Ce(III) and Ce(IV)) may be employed to achieve ultraviolet protection.

Ultraviolet blocking submicron and nanoscale powders taught herein may be incorporated into plastics, wood, fabric, paints, furniture, glass, paper, food packaging materials, housing products, flooring products, car interiors, cosmetics, and other consumer products by techniques discussed herein or any other suitable method.

In one embodiment, a method for protecting products from ultraviolet radiation comprises (a) preparing nanoscale or submicron powders comprising rare earth metals by any process, such as a process operating above 1000 K and having a process stream velocity above 0.25 mach; (b) providing powders of one or more plastics; (c) mixing the nanoscale or submicron powders with the powders of plastics; and (d) processing the mixed powders into a desired shape. In yet another embodiment, the rare earth metal containing nanoscale or submicron powders are pretreated to coat the powder surface with organic or inorganic functional groups or compounds for ease in dispersability and to ensure homogeneity. In a further embodiment, extrusion or injection molding of the mixed powders comprising nanoscale powders and plastic powders can be employed to prepare useful products.

In another embodiment, a method for protecting against ultraviolet radiation comprises (a) preparing nanoscale or submicron powders comprising rare earth metals in a process operating above 1000 K and having a process stream velocity above 0.25 mach; (b) providing a film of one or more plastics, wherein the film may be laminated, extruded, blown, cast, molded or some combination thereof; and (c) coating the nanoscale or submicron powders on the film of plastic by techniques such as, but not limited to, spin coating, dip coating, spray coating, ion beam coating, vapor deposition, sputtering.

The above teachings can be applied to glass instead of plastic to protect goods from ultraviolet radiation. In a similar way, ultraviolet protective capability can be added to other products, such as composites, wood, adhesives, fabric, paints, inks, furniture, leather, paper, food packaging materials, housing products, flooring products, car interiors, biomedical storage products, blood storage containers, biofluid containers, road signs, and indicators.

In yet other embodiments, human and pet skin may be protected from ultraviolet radiation using the following method: (a) prepare nanoscale or submicron powders comprising rare earth metals in a process operating above 1000 K and having a process stream velocity above 0.25 mach; (b) provide a medium such as, but not limited to, a cream, base, wax, spray, or solution; (c) disperse the nanoscale or submicron powders into the medium; and (d) apply the cream, base, wax, spray, or solution over the surface that needs protection. An illustrative embodiment is to use this method in existing cosmetics or personal care products. Key and surprising advantages may be obtained using the methods taught herein for protecting skin from ultraviolet radiation using ultraviolet radiation absorbing nanoparticles, such as, (a) the ability to maintain visual transparency while eliminating over 90%, and in certain embodiments 99% or more, of the ultraviolet radiation reaching the skin, (b) the ability to ensure the product is ecologically and environmental benign, (c) the ability to provide effective concentrations as low as 10% by weight, in certain embodiments less than 5% by weight, and in certain embodiments less than 2.5% by weight, (d) the absence of a high fraction of photocatalytically created radicals, (e) broad spectrum long-lasting or permanent protection, (f) ease of dispersion in aqueous media up to 10 weight % or higher without acids, alkalis, and other additives potentially harmful to skin, (g) ease and reliability with which the rare earth element containing nanoparticles can be washed off the skin by water, and (h) compatibility and stability of the nanoparticles with other additives, such as vitamins, added to skin protective formulations.

The teachings above may also be used in protecting vegetables, fruits, meats and packaged food. It is well known that foods that contain fats or oils (potato chips, snacks, meat, soups, etc.) degrade when exposed to light, in particular when exposed to ultraviolet radiation. In one embodiment, a method for enhancing the storage life of food and of protecting food comprises (a) preparing nanoscale or submicron powders comprising rare earth metals by any method, such as a method including a step operating above 1000 K and having a process stream velocity above 0.25 mach; (b) providing powders or films of one or more plastics; (c) mixing or coating the nanoscale or submicron powders onto the plastic film (laminates) or with the powders of plastics; and (d) processing the film or mixed powders into a desired package or shape. Current techniques for protecting fat containing foods include packaging them in metal or paper cans or in laminated plastic bags that include a metal layer such as aluminum. These current techniques prevent the consumer from viewing the quality of the product and thereby limit the ability to market premium products. A key and surprising advantage of the method taught herein for protecting food is the ability to maintain visual transparency of the packaging material while eliminating over 95%, and in certain embodiments 99% or more, of the ultraviolet radiation reaching the product. In another embodiment, this technique is used to protect biomedical products, device components, and pharma products sensitive to ultraviolet radiation. For example, this technique can be utilized to protect medicines, bioactive liquid droplets, tracers, markers, biomedical reagents, blood, biological samples, device tubing, catheters, angioplasty kits, components, etc. In a further embodiment, instead of plastics, glass is used as the packaging material in combination with nanoscale and submicron powders to provide protection from UV radiation. One advantage of rare earth-based element UV absorbing powders is that they are environmentally benign when the product is disposed of or destroyed by techniques such as incineration. While the teachings herein specifically discuss the use of rare earth metal comprising nanoscale and submicron powders, other compositions of powders that absorb UV radiation can also be employed in the same way to deliver similar benefits to consumers.

Nanoscale and submicron powders comprising rare earth metals offer some unusual opportunities as additives to enhance the modulus, hardness, and toughness of polymers. For example, in one embodiment, a nanoscale powder comprising yttrium oxide is mixed with a resin, adhesive, plastic, or alloy of plastics by at least 10% by weight and in certain embodiments greater than 25% by weight to enhance the hardness of the matrix by over 100%. In other embodiments, a ceramic, metal, or alloy may be employed. In one embodiment, a method of enhancing the structural property of a ceramic, metallic, alloy, or polymeric part comprises: (a) prepare nanoscale or submicron powders comprising rare earth metals in a process operating above 1000 K and having a process stream velocity above 0.25 mach; (b) provide powders of one or more ceramics, metals, alloys, or polymers; (c) mix the nanoscale or submicron powders with the powders of the ceramics, metals, alloys, or polymers; and (d) process the mixed powders into a desired shape by powder metallurgy techniques, such as injection molding or casting.

The teachings herein may also be used in protecting wood, construction products, and adhesives. Wood, construction products, and numerous commercial adhesives degrade when exposed to light, in particular when exposed to ultraviolet radiation. In one embodiment, a method for enhancing the useful life of wood products comprises (a) preparing nanoscale or submicron powders comprising rare earth metals by any method, such as a process with at least one step operating above 1000 K and having a process stream velocity above 0.25 mach; (b) providing a wood product; and (c) permeating the wood product with the nanoscale or submicron powders or coating the nanoscale or submicron powders on the wood product thereby reducing the exposure of the wood product to ultraviolet light. Key and surprising advantages realized using the approaches taught herein for protecting wood are (a) the ability of nanoparticles to infiltrate the pores of the wood product and adhere to the wood fibers, (b) the ability to maintain visual appeal of the wood product while eliminating over 95%, and in certain embodiments 99% or more, of the ultraviolet radiation reaching the product. In another embodiment, these techniques are used by incorporating the nanoparticles into wood polishes, wood protective sprays, and other such protective varnishes and creams. One advantage of rare earth-based UV absorbing powders is that they are environmentally benign when the product is disposed of or destroyed by techniques such as incineration. While the teachings herein specifically discuss the use of rare earth metal comprising nanoscale and submicron powders, other compositions of powders that absorb UV radiation can also be employed in the same way to deliver similar benefits to consumers.

The teachings herein can be used to enhance life the of and protect paper, archival materials, prints, photographs, currency, valuable documents such as passports, art work, fabric, and other products. These products degrade when exposed to light, in particular when exposed to ultraviolet radiation. In one embodiment, a method for enhancing the useful life of paper, archival materials, prints, photos, currency, valuable documents such as passports, fabric, art work and other products, comprises (a) preparing nanoscale or submicron powders comprising rare earth metals by any method, such as a method including a step operating above 1000 K and having a process stream velocity above 0.25 mach; (b) providing paper, archival materials, prints, photos, currency, valuable documents such as passports, fabric, art work; and other products; and (c) infiltrating or coating the nanoscale or submicron powders onto the paper, archival materials, prints, photos, currency, valuable documents such as passports, fabric, art work or other products thereby reducing the damage caused by UV radiation to the paper, archival materials, prints, photos, currency, valuable documents such as passports, fabric, art work and other products. Key and surprising advantages of the approach taught herein for protecting paper, archival materials, prints, photos, currency, valuable documents such as passports, fabric, art work and other products are (a) the ability of nanoparticles to infiltrate or nanolayer coat the pores or ink of the product and adhere to the fibers constituting the product; and (b) the ability to maintain visual integrity and appeal of the product while eliminating over 95%, and in certain embodiments 99% or more, of the ultraviolet radiation reaching the product. In another embodiment, these techniques are used by incorporating the nanoparticles in preservative polishes, protective sprays, and other such protective varnishes and creams. One advantage of rare earth-based element UV absorbing powders is that are environmentally benign when the product is disposed of or destroyed by techniques such as incineration. While the teachings herein specifically discuss the use of rare earth metal comprising nanoscale and submicron powders, other compositions of powders that absorb UV radiation can also be employed in the same way to deliver similar benefits to consumers or can be used in combination with rare earth comprising nanoparticles to deliver value to consumers. Similarly, while UV pigments are discussed in detail, including composition optimization details, rare earth element containing nanoparticles may be made to reflect or absorb infrared (1R) wavelengths. Such IR pigments can be used with glass or plastics to improve thermal management of an environment inside a package or inside a room.

Polishing

Cerium oxide is a well known polishing agent for glass surfaces and glass based products. Polishing processes typically aim to produce a sufficient degree of surface smoothness so that (a) light, transmitted or reflected at the surface, is not disturbed by surface irregularities and/or (b) a planar surface can be achieved for semiconductor, MEMS, or photonic device fabrication steps. Classic abrasives, such as low purity ceria dispersions, may improve surface finish but also may leave a fine but definite roughness, the size and scale of which relates to the grain size of abrasive used. Additionally, pitting and dishing may occur when non-uniform polishing conditions prevail. Superior polishing dispersions that prevent these problems are desired.

The teachings herein may be used to prepare such superior dispersions. For example, if surface roughness scale needs to be reduced to dimensions where the transmission or reflection of light of a specified wavelength is not distorted by surface roughness effects, then nanoparticles comprising rare earths and with mean particle size less than $\frac{1}{5}^{th}$ the specified wavelength, and in certain embodiments less than $\frac{1}{10}^{th}$ the specified wavelength, may be utilized. Thus, if the specified wavelength were the visible wavelengths (400–700 nm), then a superior polishing slurry is one comprising rare earth elements and nanoparticles of mean particle size less than 40 nm. For high performance products, it may be useful in certain embodiments that (a) the material composition be uniform and of high purity by metal basis, and in certain embodiments, the purity may be greater than 99.9% by metal basis; (b) the solvent used is water; and (c) minimal additives are utilized, and additives if used in the polishing slurry assist in the chemistry associated with functional groups during polishing.

In one embodiment, a method for preparing a polished surface with mean roughness depth (peak to valley, Rz) less than lambda, where lambda in certain embodiments is 25 nm or less comprises (a) preparing nanoscale powders with mean particle size less than half of lambda comprising rare earth metals by any process, such as a process with at least one step operating above 1000 K; (b) preparing a polishing slurry by dispersing the nanoscale powders in a solvent such as water; and (c) polishing a surface with the slurry. In another embodiment, the rare earth metal containing nanoscale powders are heat treated prior to dispersion preparation. In a further embodiment, nanoscale powders of rare earth silicates are utilized.

The polishing slurries taught above may be utilized to polish metal surfaces, glasses, optical products, products comprising silicon or germanium or gallium or indium, laser devices, calibration standards, ceramics, wafer layers, and any other products.

These polishing slurries can also be used for cleaning art work, statues, building surfaces, home appliances, decorative fixtures, in preparation of intricate biomedical parts, and for cleaning archived products and materials.

Nanoparticles can also be employed in polishing pastes, creams, and sprays, such as those for polishing and cleaning counters, cabinets, glassware, silverware, cookware, and other household and commercial surfaces. Surprising advantages of polishing using nanoparticles include (a) superior surface finish; (b) the ability to reduce surface roughness which is part of the cause of the rapid build up of dirt and dust on a surface; and (c) better performance from lesser use of materials.

Polishing nanoparticles can also be added to laundry powders and solutions, to dish washing detergents, soaps, creams, and gels for superior performance. Surprising advantages of polishing nanoparticles include (a) superior surface cleaning given that nanoparticles can enter finer pores and structures of the dirt, oil, and other causes of unclean surfaces; (b) superior mechanical and electrochemical properties with smaller sites which serve as high site density for faster cleaning at a given weight concentration of cleaning particles; (c) the ability to reduce surface roughness which is part of the cause of the rapid build up of dirt and dust on a surface; and (d) better performance from lesser use of materials.

Polishing nanoparticles can further be added to toothpaste and gels, other mouthwash media, and as skin exfoliating additives. Advantages of nanoparticles used in these applications include (a) superior surface cleaning given that nanoparticles can enter finer pores and structure of the dirt, oil, and other causes of unclean surfaces; (b) superior mechanical and electrochemical properties with smaller sites which serve as high site density for faster cleaning at a given weight concentration of cleaning particles; and (c) better performance from lesser use of materials.

Additionally, polishing nanoparticles can be combined on a surface or in other ways with other nanoparticles (e.g.

hydroxyapatite), nutrients, and other additives to heal, nourish, and renew the surface or product being cleaned.

While the teachings herein specifically discuss the use of rare earth metal comprising nanoscale and submicron powders, other compositions of polishing powders in nanoparticle form can also be employed in the same way to deliver similar benefits to consumers or can be used in combination with rare earth comprising nanoparticles to deliver value to consumers.

Metallurgy

The unusually high affinity of rare earth metals for oxygen and sulfur when combined with nanoparticle technology enables novel applications. A historical problem with many metal-forming processes has been the undesirable inclusion of oxygen and/or sulfur during the processes, both of which degrade the mechanical performance of a metal or alloy part. Similarly, in manufacturing processes, such as those used to make semiconductors, where even small quantities of oxygen in the environment can cripple the performance of the desired product, technologies are desired that can reliably remove the oxygen. Nanoparticles comprising rare earth metals can serve this function. Benefit of nanoparticles include their high surface areas, fast diffusion rates, high availability, unusual electrochemistry, and the small size.

In one embodiment, a method for enhancing the mechanical properties, such as toughness, hardness, modulus, strength, creep resistance, and ductility, by at least 5% comprises (a) preparing nanoscale or submicron powders comprising rare earth metals by any method, such as a method with at least one step operating above 1000 K and having a process stream velocity above 0.25 mach; (b) providing powders or a melt of metals, alloys, or metal comprising composites; (c) mixing the nanoscale or submicron powders into the metals, alloys, or metal comprising composites such that the rare earth content by metal weight in the mixture is greater than 0.005% and less than 20%, in certain embodiments less than 10%, and in certain embodiments less than 5%; and (d) processing the mixture into a part with superior properties. Illustrative, but non-limiting specific metals and alloys for use with this method include—steel, copper, aluminum, brass, bronze, cast iron, nickel, cobalt, titanium, gold, silver, superalloys (nickel or cobalt or titanium based, e.g.), aluminum alloys, zinc alloys, and zirconium alloys.

In another embodiment, a method for ensuring a very low oxygen environment during a process comprises (a) preparing nanoscale or submicron powders comprising rare earth metals by any method, such as a method with at least one step operating above 1000 K and having a process stream velocity above 0.25 mach; (b) preparing a porous film or product from the nanoscale or submicron powders with specific surface area greater than 5 square meter per gram; and (c) providing the porous film or product in the processing environment thereby ensuring that the processing environment has an oxygen concentration as low as possible and in certain embodiments less than 1000 ppm. Illustrative, but non-limiting, specific processing environments that can benefit from such a low oxygen environment provided by rare earth element comprising nanoparticle-based oxygen getters include—silicon processing, semiconductor processing, heated or arcing metal wires and electrodes, and evaporation or coating of metal or alloys or non-oxide ceramics. In arcing and welding environment, another surprising benefit of rare earth comprising nanoparticles is the arc strike reliability, high temperature strength, arc uniformity and arc stability.

Similarly, rare earth comprising nanoparticle-based hydrogen getters may be prepared where the hydrogen concentration needs to be controlled. Rare-earth comprising nanoparticles with surface areas greater than 10 square meters per gram, and in certain embodiments greater than 25 square meter per gram, may be used in hydrogen storage as well.

Reducing Greenhouse Gases

Graphite electrodes are commonly used in many electrochemical devices and processes. For example, aluminum manufacturing requires the use of graphite electrodes. Other metals and alloys are also often used, such carbon based electrodes. During these processes, the graphite gets consumed and converted into carbon dioxide—a greenhouse gas. Technologies are desired that can reduce greenhouse gases. A method to reduce these gases is to replace the use of graphite with materials that offer similar electrical and electrochemical performance with oxidation resistance in molten environment and at the high temperatures. Coatings prepared from rare earth comprising nanoparticles, such as an oxide comprising cerium, offer such an unusual combination of properties while being self-stabilizing.

In one embodiment, a method for reducing greenhouse gases during metal manufacturing or processing comprises (a) preparing nanoscale or submicron powders comprising rare earth metals by any method, such as a method with at least one step operating above 1000K and having a process stream velocity above 0.25 mach; (b) providing an electrode surface; (c) coating the nanoscale or submicron powders on the electrode; and (d) manufacturing or processing the metal on such coated substrates. Illustrative, but non-limiting, specific metals and alloys include—aluminum, aluminum alloys, zinc alloys, and chrome alloys.

The above principle can also be used to replace hazardous metal coatings with non-toxic coatings. For example, hazardous heavy metal-based coatings, such as lead or chromium coatings, currently used to decorate or protect metallic surfaces may be replaced with safer rare earth element comprising nanoparticles-based coatings for similar or superior performance. For example, wherever halide chemistry is employed to prepare coatings or powders, rare earth metal oxides offer an alternative or complimentary technology.

Electroceramics

Nanoparticles comprising rare earth elements offer several unusual benefits to electroceramic applications. These benefits are a consequence of (a) the small size of nanoparticles which can enable very thin film devices, (b) high surface areas which can lower the sintering temperatures and sintering times, (c) unusually low temperature coefficients and voltage coefficients of electromagnetic properties (resistance, capacitance, inductance, frequency dependent properties), (d) ease of dispersability in various media and inks, and (e) unusual and complex combinations of vapor pressures, work functions, and band gaps. Novel nanoparticle electroceramics comprising rare earth elements include, but are not limited to, nanoparticles of titanates comprising Nd, La, Y, Ce, Eu, Pr; ferrites comprising Nd, Ce, Sm, La, Y and/or Pr; borides comprising La, Ce, Y, Eu, Sm and/or Nd; chromites comprising La, Ce, Y, Eu, Pr, and/or Nd; perovskites (such as cobaltates) comprising La, Ce, Y, Nd, Pr, and/or Eu; and cuprates comprising Y, La, Ce, Eu, Pr, and/or Nd. A few embodiments that utilize these teachings are illustrated below.

In one embodiment, a method for preparing superior electroceramic devices comprises (a) preparing nanoscale or submicron powders comprising rare earth metals by any method, such as a method with at least one step operating above 1000 K and having a process stream velocity above 0.25 mach; (b) providing one or more electrode surfaces; and (c) processing the nanoscale or submicron powders in a way that there is an electromagnetic connectivity between the electrode(s) and processed nanoscale or submicron powders.

In another embodiment, a method for preparing superior electrorheological products comprises (a) preparing nanoscale or submicron powders comprising rare earth metals by any method, such as a method with at least one step operating above 1000 K and having a process stream velocity above 0.25 mach; (b) providing n stable solvent, such as dimethylsilicone oil; (c) dispersing the nanoscale or submicron powders into the solvent; and (d) utilizing the dispersion as a electrorheological fluid.

In yet another embodiment, a method for preparing superior resistors or heating elements for high temperature furnaces or electrodes for electrical devices operating at extreme (high or low) temperatures comprises (a) preparing nanoscale or submicron oxide powders comprising rare earth metals by any method, in certain embodiments in a process operating above 1000K and a process stream velocity above 0.25 mach (b) building a resistive element from the powders (c) incorporating the resistive elements in an electrical circuit.

Another non-limiting embodiment consistent with teachings herein for a method for preparing superior electron emitters comprises (a) preparing nanoscale or submicron powders (e.g. borides) comprising rare earth metals by any method, such as method with at least one step operating above 1000 K and having a process stream velocity above 0.25 mach; (b) building an electron emitting element from the powders; and (c) incorporating the electron emitting element into an electrical circuit.

A further non-limiting embodiment consistent with teachings herein for a method for preparing superior capacitors for extreme temperature applications or capacitive sensors operating at broad temperature ranges comprises (a) preparing nanoscale or submicron oxide powders comprising rare earth metals by any method, such as a method with at least one step operating above 1000 K and having a process stream velocity above 0.25 mach; (b) building a dielectric layer from the powders; and (c) incorporating the dielectric layer with electrode layers to form a capacitor. Single layer or multi-layer devices may be built in different embodiments.

Other superior devices capable of working at broad temperature ranges may also be prepared. Illustrations include, but are not limited to, thermistors, piezoelectric devices, superconducting devices, sensors, radiation absorbers, radiation detectors etc.

Catalysts

Nanoparticles comprising rare earth elements offer several unusual benefits to catalytic applications. These benefits are in part a consequence of one or more of the following characteristics: (a) the presence of f-orbital electrons, (b) high surface area, (c) unusually high stability in physical properties at extreme temperatures, (d) ease of dispersability in various media and inks, (e) unusual and complex combinations of vapor pressures, work functions, and band gaps, (f) high melting points which enable operations at high temperatures without unacceptable loss of surface areas with time. Non-limiting specific illustrations of novel nanoparticle catalysts comprising rare earth elements include nanoparticles of oxides comprising La, Y, Ce, Nd, Eu, Sm, Sc and/or Pr; silicates, aluminates and manganates comprising Ce, Sm, La, Nd, Y, Sc and/or Pr; ferrites, nickel oxides, and vandates comprising La, Ce, Y, Eu, Sc, Sm and/or Nd; precious metal composites comprising La, Ce, Y, Eu, Pr, Sm and/or Nd; perovskites (such as cobaltates) comprising La, Ce, Y, Nd, Pr, and/or Eu; zincates, zirconates and cuprates comprising Y, La, Ce, Eu, Pr, and/or Nd. In other embodiments, multi-metal compositions (two, three, four or more) comprising rare earth metals are utilized. These catalyst powders may be used for applications such as, but not limited to, environmental remediation, synthesis of fine chemicals, biochemical synthesis, pharma discovery and synthesis, production of fuels such as hydrogen and liquids from various gases and raw materials, inorganic chemistry, organic chemistry, organometallic chemistry, diagnosis, tracers, and reagents. A few embodiments that utilize these teachings are illustrated below.

A non-limiting embodiment consistent with teachings herein for a method for producing more desirable or valuable substances from less desirable or valuable substances comprises (a) preparing nanoscale multi-metal powders comprising rare earth metals by any method, such as a method with at least one step operating above 1000 K and having a process stream velocity above 0.25 mach such that the surface area of the said powder is greater than 25 square meters per gram, in certain embodiments greater than 75 squares meter per gram, and in certain embodiments greater than 150 square meters per gram; (b) conducting a chemical reaction over the said nanoscale powders comprising rare earth metals. In some embodiments, a further step of dispersing the nanoscale powders in a solvent and then depositing these powders onto a substrate from the dispersion may be employed before chemical reactions are conducted.

A non-limiting embodiment consistent with the teachings herein for a method for producing more desirable or valuable substances from less desirable or valuable substances comprises (a) preparing non-stoichiometric nanoscale powders comprising rare earth metals by any method, such as a method with at least one step operating above 1000 K and having a process stream velocity above 0.25 mach such that the surface area of the said powder is greater than 25 square meters per gram, in certain embodiments greater than 75 square meters per gram, and in certain embodiments greater than 150 square meters per gram; and (b) conducting a chemical reaction over the said non-stoichiometric nanoscale powders comprising rare earth metals.

The catalyst powders described above can be combined with zeolites and other well defined porous materials to enhance the selectivity and yields of useful chemical reactions.

Optics, Phosphors and Detectors

Nanoparticles comprising rare earth elements offer several unusual benefits as phosphors and for detector applications. In certain embodiments, these benefits are in part a consequence of one or more of the following characteristics: (a) small size, (b) high surface area, (c) unusually high stability in physical properties at extreme temperatures, (d) ease of dispersability in various media, inks, and solid matrices, (e) unusual and complex combinations of density, vapor pressures, work functions, and band gaps, and (f) f-orbitals. Some advantages of phosphors and detectors comprising rare earth element containing nanoparticles include (a) high dots per inch density, (b) ability to form homogeneous products, and (c) the ability to prepare very thin films thereby reducing the raw material required for same or superior performance. Rare earth elements are heavy and/or expensive and technologies that can reduce the raw material required for the same or superior performance are actively desired in various products. Nanoparticles can also be post-processed, such as by calcination or sintering, to grow the grain to the optimal size in order to provide the brightness level, decay time, and any other characteristics as desired.

Non-limiting specific illustrations of novel nanoparticle phosphors comprising rare earth elements include nanoparticles of silicates, aluminates, and manganates comprising alkali metals or alkaline earth metals and one or more of the following—Eu, Ce, Sm, La, Nd, Y, Tb, Tm, Gd, and/or Pr; tantalates comprising Eu, Ce, Sm, La, Nd, Y, Tb, Tm, Gd, and/or Pr; borides, sulfides, phosphides, nitrides, halides, oxyborides, oxysulfides, or oxyphosphides comprising Eu, Ce, Sm, La, Nd, Y, Tb, Tm, Gd, and/or Pr; zincates, zirconates or cuprates comprising Eu, Ce, Sm, La, Nd, Y, Tb, Tm, Gd, and/or Pr. In other embodiments, multi-metal compositions (two, three, four or more) comprising rare earth metals are utilized. These phosphor nanopowders may be used for display applications, lamps, fluorescent bulbs, light emitting devices, markers, security pigments, fabric pigments, paints, toys, special effects, etc.

Examples of novel nanoparticle radiation detecting materials comprising rare earth elements include, but are not limited to, nanoparticles of tantalates comprising Eu, Ce, Sm, La, Nd, Y, Tb, Tm, Gd, Lu and/or Pr; and borides, sulfides, phosphides, nitrides, halides, oxyborides, oxysulfides, or oxyphosphides comprising Eu, Ce, Sm, La, Nd, Y, Tb, Tm, Gd, Lu and/or Pr. In other embodiments, multi-metal compositions (two, three, four or more) comprising rare earth metals are used. These detector powders may be used for display applications, magnetic resonance imaging, x-ray detectors, radiation detectors, etc.

In one embodiment, a method for producing articles that glow in dark comprises (a) preparing by any process, such as a process with at least one step operating above 1000 K and having a process stream velocity above 0.25 mach, a nanoscale silicate or a aluminate powder comprising (i) alkali metal and/or alkali earth metal, and (ii) rare earth metals; (b) providing powders of one or more plastics; (c) mixing the nanoscale powders with the powders of plastics; and (d) co-extruding the mixed powders into a desired shape. In another embodiment, a master batch of the plastic powder comprising rare earth metal containing nanoscale powders may be prepared. These master batches can later be processed into useful products by techniques well known to those skilled in the art. In other embodiments, the rare earth metal containing nanoscale powders are reduced or pretreated to coat the powder surface with organic or inorganic compounds or functional groups for improved performance and to ease in dispersability and to ensure homogeneity. In a further embodiment, injection molding of the mixed powders comprising nanoscale powders and plastic powders may be employed to prepare useful products.

An illustrative embodiment for incorporating nanoscale phosphor powders into plastics comprises coating the nanoscale powders on a film of plastic by techniques such as, but not limited to, spin coating, dip coating, spray coating, ion beam coating, and sputtering. In another embodiment, a nanostructured coating is formed directly on the film by techniques such as those taught herein. The grain size of the coating may be less than 500 nm in certain embodiments, less than 250 nm in certain embodiments, and less than 50 nm in certain embodiments.

The above teachings can be applied to matrices other than plastics, e.g. glass by methods described herein.

Reagent and Raw Material for Synthesis

Nanoparticles comprising one or more rare earth elements are useful reagents and precursors to prepare other compositions of nanoparticles comprising rare earth elements. In a generic sense, a method for preparing a rare earth element containing compound is (a) providing nanoparticles comprising rare earth elements; (b) providing a reactor wherein the nanoparticles comprising rare earth elements are reacted with another compound, such as, but not limited to, an acid, alkali or solvent; (c) controlling the temperature, pressure, environment, mixing pattern and level, residence time and/or pH of the said reactor to control the said reaction of nanoparticles; and (d) collecting and if appropriate filtering and/or drying the products of the reaction. An unusual and surprising benefit of nanoparticles as a reagent is their high surface area and surface reactivity which facilitates the mixing, reaction sites, and overall kinetics. For these applications, nanoparticles comprising one or more rare earth elements with surface areas greater than 5 $m^2/gm$ are used, in certain embodiments those with areas greater than 25 $m^2/gm$ are used, in certain embodiments those with areas greater than 75 $m^2/gm$ are used, and in certain embodiments those with areas greater than 150 $m^2/gm$ are used. Furthermore, if the reactor requires heat transfer, the presence of nanoparticles may enhance the heat transfer coefficient. In certain embodiments, the reaction may be conducted such that the product or products resulting from such a reaction are in certain embodiments also nanoparticles. These product nanoparticles may then be suitably applied or utilized as catalysts or as reagents to prepare other fine chemicals. A few non-limiting illustrations utilizing nanoparticles comprising rare earth element containing nanoparticles follow. These teachings can be extended to other compositions such as rare earth nitrates, carbonates, and organometallics based on nanoparticles comprising rare earth elements.

Organometallics: Rare earth carbonate nanoparticles may be dissolved in an organic acid to produce an organometallic comprising rare earth element. For example, cerium carbonate hydrate nanoparticles may be dissolved in 2-ethyl hexanoic acid at temperatures below the boiling point of 2-ethyl hexanoic acid. High purity nanoparticles may be used in the same manner to produce high purity rare earth chemicals for a wide range of applications. In one embodiment, a method for producing organometallics comprising rare earth elements comprises (a) preparing nanoscale powders comprising rare earth elements by any method, in certain embodiments teachings herein; (b) reacting the nanoscale powders with an organic liquid such as an organic acid; and (c) collecting the resultant organometallic comprising rare earth. Acetates, propanoates, hexanoates, esters, amines, aromatic compounds, dendrimers, etc. comprising rare earth elements may be prepared in this manner.

Nitrates: Nanomaterials comprising rare earth elements may be dissolved in nitric acid to prepare rare earth element nitrates. For example, nanoparticles of yttrium oxide dissolve readily and surprisingly fast in nitric acid solution maintained below 100° C. thereby producing yttrium nitrate solution. In one embodiment, a method for producing nitrates containing rare earth elements comprises (a) preparing nanoscale powders comprising at least one rare earth element by any method, such as the methods taught herein; (b) reacting the nanoscale powders with nitric acid; and (c) collecting the resultant nitrate containing at least one rare earth element. Sulfates, phosphates and halides of rare earth elements can be prepared by substituting nitric acid with respective acid.

Hydroxides: Nanomaterials comprising rare earth elements can be dissolved in nitric acid and then further reacted with alkaline solution to prepare rare earth element hydroxides. For example, nanoparticles of yttrium oxide are dissolved in nitric acid solution maintained below 100° C. thereby producing yttrium nitrate solution. The nitrate solution may then be reacted with ammonium hydroxide to produce yttrium hydroxide. In one embodiment, a method for producing hydroxides comprising rare earth elements comprises (a) preparing nanoscale powders comprising at least one rare earth element by any method, such as those methods taught herein; (b) reacting the nanoscale powders with an acid (solution with pH less than 6); (c) reacting the products of the acid reaction with an alkali (solution with a pH greater than 8); and (d) collecting the resultant hydroxide comprising at least one rare earth element.

EXAMPLE 1

Pigment Powders 99.9 weight % by metal pure cerium ethylhexanoate precursor was diluted with hexane until the viscosity of the precursor was less than 100 cP. This mix was sprayed into a thermal plasma reactor at a rate of about 50 ml/min using about 40 standard liters per minute oxygen. The peak temperature in the thermal plasma reactor was above 3000 K. The vapor was cooled and then quenched by Joule-Thompson expansion. The powders collected were analyzed using X-ray diffraction (Warren-Averbach analysis) and BET. It was discovered that the powders had a crystallite size of less than 25 nm and a specific surface area greater than 50 $m^2$/gm. The color of the powder was light yellow.

EXAMPLE 2

Pigment Powders

Next, praseodymium-doped cerium precursor was processed in the same manner as in Example 1. It was discovered that the powders had a crystallite size of less than 40 nm and a specific surface area greater than 20 $m^2$/gm. The color of the powder was red. This example shows that doping by rare earth elements can create color pigments, and the thermal plasma process can be used to create nanoscale particles of color pigments. This example also reduces to practice a method of making nanoparticles comprising more than one rare earth element.

EXAMPLES 3–8

Ultraviolet Absorbing Powders

Using the process of Example 1, the following nanoparticle compositions were synthesized—undoped ceria, 2% potassium doped ceria, 5% potassium doped ceria, 2% lanthanum doped ceria, and 5% lanthanum doped ceria. The powders were characterized using X-ray diffractometer and 10 point BET surface area analyzer. All the powders were found to have a mean particle size less than 100 nanometers. Undoped ceria nanoparticles were found to have a mean particle size less than 20 nm. These powders were then dispersed in demineralized water without any additives using a sonicator for 3 minutes each. The ceria dispersion was prepared at two loadings in water, both less than 1 wt %—more specifically 0.035 wt % and 0.004 wt %. The doped ceria powders were dispersed at 0.01 wt % loading.

These powders were then analyzed using a UV-Vis spectrophotometer to measure transmittance of light through the dispersion at various wavelengths (from ultraviolet to near infrared). Given the commercial significance of ultraviolet wavelengths at UV-A range (290–320 nm) and UV-B range (320–400 nm), transmittance data were obtained at 310 nm and 358 nm. The following observations were made:

| (1) Composition<br>(2) of dispersion | Transmittance<br>at 310 nm | Transmittance<br>at 358 nm |
| --- | --- | --- |
| (3) 0.035% undoped ceria | 0 | 0 |
| (4) 0.004% undoped ceria | 94 | 42 |
| (5) 0.01% (2%K doped ceria) | 56 | 24 |
| (6) 0.01% (5%K doped ceria) | 25 | 11 |
| (7) 0.01% (2% La doped ceria) | 116 | 50 |
| (8) 0.01% (5% La doped ceria) | 133 | 58 |

These examples show that undoped ceria nanoparticles are effective in blocking 100% of the specific wavelengths even at concentrations significantly less than 5 weight %. This is significant because commercial alternative UV absorbers require much higher loadings to effectively absorb UV.

The doped ceria results suggest that certain dopants surprisingly enhance absorption (5% K is better than 2% K) while other degrade absorption (5% La is worse than 2% La). This example shows that nanoparticles comprising a rare earth element and other elements from the periodic table can be prepared. The example once again demonstrates that nanoparticles comprising more than one rare earth elements can be prepared.

EXAMPLE 7

Yttria and Yttria-Stabilized Powders

Yttrium ethylhexanoate was used to prepare nanoparticles of yttrium oxide using the process of Example 1. The powder was found to have a mean particle size less than 50 nanometers (XRD) and was yttrium oxide phase. This example illustrates that teachings herein can be used to prepare nanoparticles of another rare earth element.

EXAMPLE 8

Rare Earth Element and Non-Rare Earth Element Nanoparticles

In yet another example, yttrium ethylhexanoate was mixed with zirconium octoate (to give 6:94::Y2O3:ZrO2) and then processed as in Example 1. The powders were found to be uniform and with a crystallite size less than 40 nanometers as measured by X-ray using Warren-Averbach method. This example shows that nanoparticles comprising a rare earth element and other elements from the periodic table can be prepared.

EXAMPLE 9

Yttria Composite

66% by weight of yttrium oxide nanoparticles prepared in a manner similar to Example 1 were mixed with 34% by weight powders of a UV curable polymer resin. These were mixed with a spatula and then placed inside a mold to form a nanoparticle-polymer composite pellet. The yttria nanoparticle containing pellet disc was then cured with UV light source for 1 minute. To compare, another pure polymer pellet disc was prepared in the same manner. The pellet discs were then analyzed for Vickers hardness using microindentation technique. It was found that the yttria containing polymer nanocomposite pellet was 300% harder than the pellet without any nanoparticle additive.

EXAMPLE 10–11

Rare Earth Compounds and Organometallics 1 kg of cerium carbonate hydrate (99%+ purity) was mixed into 3.1 kgs of 2-ethyl hexanoate (99%+ purity). These were mixed in a beaker and processed at 90 C for 5 hours. The mixture turned to a clear orange-yellow cerium 2-ethylhexanoate solution.

100 grams of yttrium oxide nanoparticles (99%+ purity) were mixed into 1 liter of nitric acid solution (pH=2) maintained at 75 C. After 1 hour, the solution was filtered and then dried to produce powders comprising yttrium nitrate. These powders were re-dissolved in 100 cc of water and reacted with ammonium hydroxide (pH=11) yielding a precipitate corresponding to yttrium hydroxide. The yttrium hydroxide was reacted with 2-ethyl hexanoic acid by maintaining the suspension for 3 hours at 85° C. The resulting product corresponded to an organometallic comprising yttrium.

EXAMPLE 12

Lanthanum Oxide Powders

Lanthanum carbonate hydrate was dissolved in 2-ethyl hexanoic acid which was then used to prepare nanoparticles of lanthanum oxide using the process of Example 1. The powder was found to be white and had a surface area greater than 40 $m^2/gm$, an equivalent particle size less than 30 nanometers. This example illustrates that teachings herein can be used to prepare nanoparticles comprising lanthanum.

EXAMPLE 13

Neodymium Oxide Powders

Neodymium carbonate was dissolved in 2-ethyl hexanoic acid which was then used to prepare nanoparticles of neodymium oxide using the process of Example 1. The powder was found to be light blue and have a BET surface area greater than 30 $m^2/gm$, an equivalent particle size less than 40 nanometers. This example illustrates that teachings herein can be used to prepare nanoparticles comprising neodymium.

EXAMPLE 14

Europium Oxide Powders 99.99%+ pure europium nitrate hydrate was dissolved in isopropyl alcohol which was then used to prepare nanoparticles of europium oxide using the process of Example 1. The powder was found to be white and have a BET surface area greater than 8 $m^2/gm$, an equivalent particle size less than 100 nanometers. This example illustrates that teachings herein can be used to prepare nanoparticles comprising europium.

EXAMPLE 15

Terbium Oxide Powders

Terbium nitrate hydrate was dissolved in isopropyl alcohol which was then used to prepare nanoparticles of terbium oxide using the process of Example 1. The powder was found to be brown and have a surface area greater than 10 $m^2/gm$, an equivalent particle size less than 80 nanometers. This example illustrates that teachings herein can be used to prepare nanoparticles comprising terbium.

EXAMPLE 15

Praseodymium Oxide Powders 99.9% pure praseodymium nitrate hydrate was dissolved in isopropyl alcohol which was then used to prepare nanoparticles of praseodymium oxide using the process of Example 1. The powder was found to be dark brown and have a crystallite size of less than 50 nanometers by Warren-Averbach analysis of X-ray spectra. This example illustrates that teachings herein can be used to prepare nanoparticles comprising praseodymium.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

We claim:

1. A method for preparing a composition of matter containing at least one rare earth element comprising:
providing a first composition which comprises nanoparticles comprising at least one rare earth element; and
reacting the first composition with an organic liquid or nitric acid wherein the reaction creates a second composition comprising at least one rare earth element that is different from the first composition.

2. The method of claim 1, wherein the second composition of matter is an inorganic compound.

3. The method of claim 1, wherein the second composition of matter is an organic compound.

4. The method of claim 1, wherein the at least one rare earth element is scandium (Sc).

5. The method of claim 1, wherein the at least one rare earth element is yttrium (Y).

6. The method of claim 1, wherein the at least one rare earth element is lanthanum (La).

7. The method of claim 1, wherein the at least one rare earth element is cerium (Ce).

8. The method of claim 1, wherein the at least one rare earth element is praseodymium (Pr).

9. The method of claim 1, wherein the at least one rare earth element is selected from neodymium (Nd), samarium (Sm), gadolinium (Gd), terbium (Tb), dysprosium (Dy), holmium (Ho), erbium (Er), thulium (Tm), ytterbium (Yb), and lutetium (Lu).

10. The method of claim 1, wherein the at least one rare earth element is europium (Eu).

11. The method of claim 1, wherein the second composition of matter comprises nanoparticles.

12. The method of claim 1, wherein the second composition of matter comprises a dispersion.

13. The method of claim 1, wherein the surface area of nanoparticles is greater than 25 $m^2/gm$.

14. The method of claim 1, wherein the second composition of matter comprises submicron particles.

15. The method of claim 1, wherein the second composition of matter comprises at least one precursor.

16. The method of claim 1, wherein the first composition comprises at least one oxide.

17. The method of claim 1, wherein the first composition comprises at least one carbonate.

18. The method of claim 1, wherein the first composition comprises at least one nitrate.

19. The method of claim 1, wherein the first composition comprises at least one hydroxide.

20. The method of claim 1, wherein the second composition different from the first composition comprises nanoparticles.

21. The method of claim 1, wherein the organic liquid is an organic acid.

22. The method of claim 21, wherein the second composition comprises a compound selected from the group consisting of an acetate, a propanoate, a hexanoate, an ester, and an amine.

23. The method of claim 22, wherein the second composition comprises hexanoate nanoparticles.

24. The method of claim 1, wherein the substance is nitric acid.

25. The method of claim 24, wherein the second composition comprises a compound selected from the group consisting of a sulfate, a phosphate, or a halide.

26. The method of claim 24, further comprising reacting the second composition with an alkaline solution to form a hydroxide compound.

27. The method of claim 1, wherein the first composition is made by a precursor which comprises at least one metal carboxylate.

28. The method of claim 1, wherein the second composition comprises an organometallic rare earth element comprising a compound selected from acetates, propanoates, hexanoates, esters, amines, and aromatics.

* * * * *